UNITED STATES PATENT OFFICE.

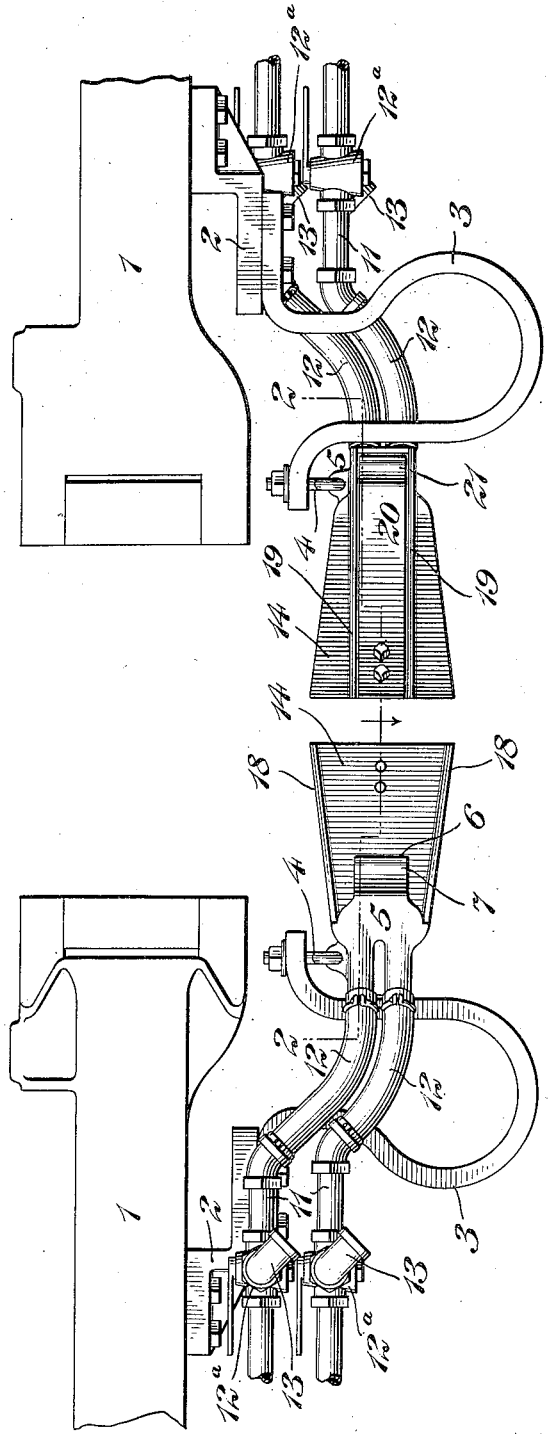

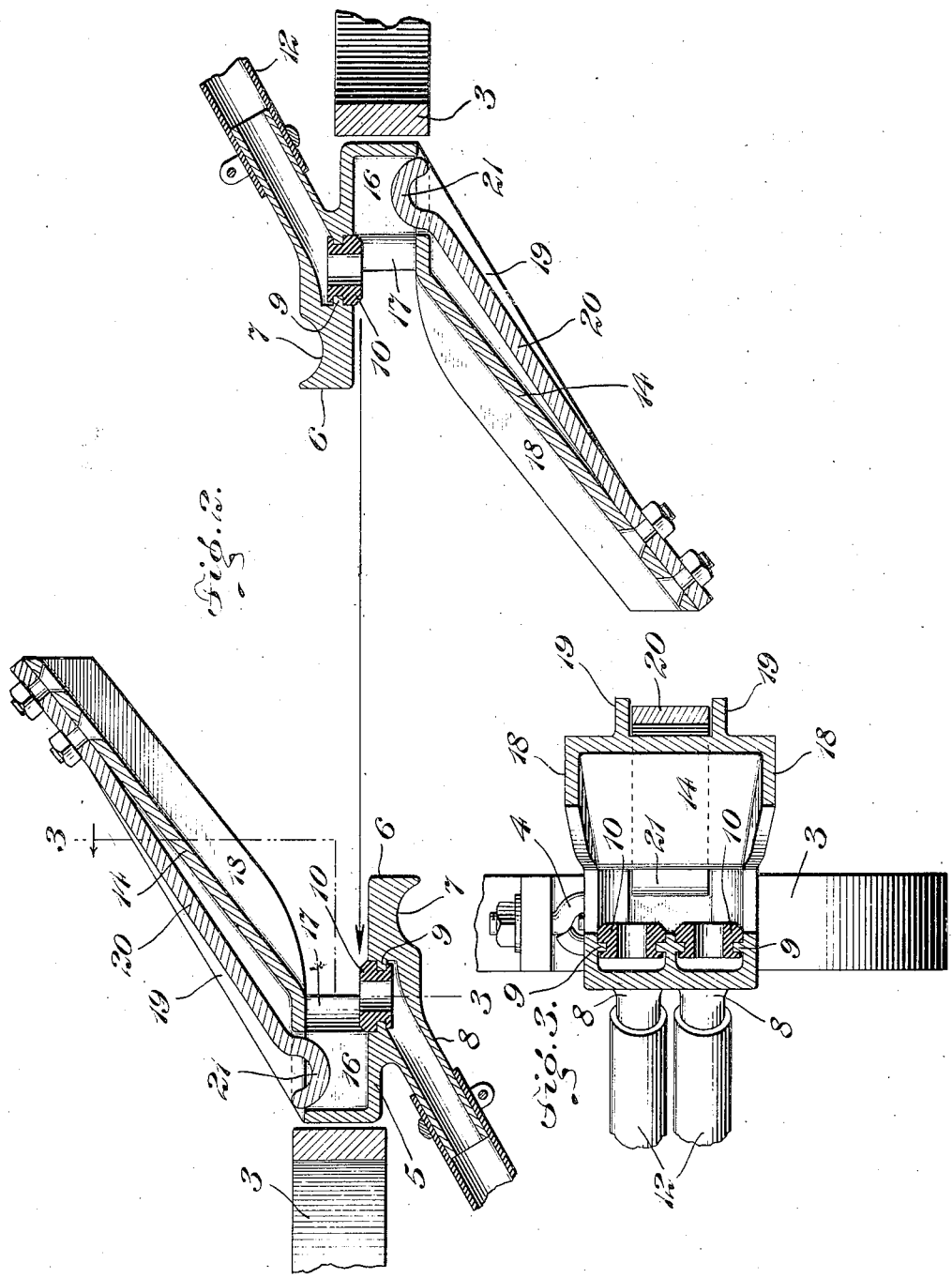

WILLIAM F. THORNTON, JR., OF GERMANTOWN, PENNSYLVANIA.

AUTOMATIC AIR AND STEAM PIPE COUPLING.

No. 844,975.

Specification of Letters Patent.

Patented Feb. 19, 1907.

Application filed August 15, 1906. Serial No. 330,675.

*To all whom it may concern:*

Be it known that I, WILLIAM F. THORNTON, Jr., a citizen of the United States, and a resident of Germantown, in the county of Philadelphia and State of Pennsylvania, have invented a new and Improved Automatic Air and Steam Pipe Coupler, of which the following is a full, clear, and exact description.

This invention is an improvement in air and steam pipe couplers, designed to automatically form an effective connection between such corresponding pipes on different cars when brought together and to automatically disconnect when the cars are separated.

Another object of the invention is to simplify the construction of devices of this character, making them positive and perfect in action even when the coupling of the cars takes place under the most unfavorable circumstances, as when brought together on sharp curves or when the couplers of the cars stand at different heights; further, to provide for the connecting of the air and steam pipes of one of my improved automatic couplers with such pipes of an adjacent car when the latter is not thus provided.

One embodiment of the invention comprises a substantially hook-shaped spring in fixed relation at one end of the draw-bar of the car and suspending at its opposite end a pipe coupler-head capable of slight lateral movement. The coupler-head is constructed with a nose and a guide-plate, which join together, forming an intermediate pocket. Air or steam pipe connections lead through the nose near its base, preferably in an angular direction, and carry suitable gaskets on the inner face of the nose and in an opposed position to a spring secured to the guide-plate and entering one side of the pocket. A three-way cock provided for each pipe-line directs the air or steam to one of the aforesaid connections or to a side pipe which is used when coupling a car provided with my automatic coupler with a car otherwise equipped for this purpose.

Reference is to be had to the accompanying drawings, forming part of this specification, in which similar characters of reference indicate corresponding parts in all the views.

Figure 1 is a side elevation of the draw-head of two adjacent cars with my improved automatic coupler attached to each of them. Fig. 2 is a horizontal sectional view substantially on the line 2 2 of Fig. 1; and Fig. 3 is a vertical sectional view on the line 3 3 of Fig. 2.

The coacting couplers are of identical construction, and therefore a description of one will suffice for the other.

The numeral 1 indicates a draw-head of a car to the under face of which is bolted or otherwise secured a bracket 2, having fixed to its forward end a spring 3. This spring is bent in a vertical plane in substantially the shape of a hook and suspends at its forward end, by means of an eyebolt 4, a coupler-head 5. It is obvious by this connection of the head 5 to the eyebolt 4 that the head will be capable of a free but limited lateral movement. The coupler-head 5 is made up of a nose 6, having an inner flat face with a curved recess 7 on its opposite face at its outer end. Passing from the outside of the nose 6 near its face are nipples 8 for the air and steam pipe connection. The bore of these nipples passes through the nose 6 and are provided near the inner face thereof with inwardly-extending flanges 9, which coact with corresponding grooves in an extra heavy gaskets 10, preferably of rubber, these gaskets, as shown, projecting slightly beyond the inside face of the nose. The outer ends of the nipples 8 are coupled with the air and steam pipes 11 by the intermediate hose 12. Suitable three-way cocks 12$^a$ in connection with the pipes 11 act to direct the air or steam through the hose and nipples or to pipes 13, leading at one side thereof, which are to be used in forming the air or steam pipe connection when the adjacent car is not equipped with my improvement, the cocks 12$^a$ being also capable of cutting off the communication between both the automatic coupler and the side pipe 13 when desired.

The head 5, opposite the nose 6, is fashioned into a guide-plate 14, leaving an intermediate pocket 16, which is provided at its bottom and top edges with outwardly-flaring lips 17 for a purpose hereinafter made apparent. The guide-plate 14 extends outwardly at an angle of about thirty degrees and uniformly increases in width from its inner to its outer end, the bottom and top edges of the guide-plate being turned inwardly to form flanges 18, and the opposite side of the guide-plate being provided with ribs 19, increasing in width from their outer to their inner ends, thereby materially adding to the strength of the guide-plate. These ribs 19 are arranged parallel to each other at each side of a median plane and have secured between them to the outer end of the guide-plate a flat spring 20, extending rearwardly, where it is provided with a hooked end 21, the back face of which enters the pockets 16 through an opening provided therefor. When two opposed couplers of the construction thus described come together, the noses 6 strike the opposed guide-plates 14, which direct them into the pockets 16 and automatically engage the recesses 7 in their outer faces with respective opposed hook members 21, the spring 20 carrying these hooked members acting to throw the gaskets 10, carried in the inner face of each nose, directly together and forming an air and steam tight connection. When the couplers are pulled apart, the noses 6 act to automatically disengage with their respective spring-hooks, thereby permitting them to freely separate. Should the cars be on a curve or the couplers be at slightly different heights, it is obvious from the construction that the coupling will be as effectively performed. The noses 6 will be prevented from leaving the guide-plates when moving toward each other by the flanges 18, and the lips 17 will act to direct the noses into the opposed pockets 16 with certainty, the slight lateral play of each of the couplers 5 on the eyebolts 4 enabling the couplers to assume an angular position to each other. When the cars are brought together with considerable force, the hook-springs 3 will admit of considerable rearward yielding of each of the coupler-heads and engage them without damage, which would not be possible if the coupler-heads were rigidly connected. These springs further act to compensate for the distances between the cars, which when coupled together and in motion are at all times variable.

Although I have described the invention in detail, it is to be understood that the precise embodiment is not material provided the essential characteristics are employed as pointed out in the annexed claims.

Having thus described my invention, I claim as new and desire to secure by Letters Patent—

1. In an automatic pipe-coupler the combination of a nose having a recess at one side thereof, a guide-plate, a pocket formed intermediate the nose and guide-plate, a spring secured to the guide-plate having a hooked inner end entering an opening at one side of the pocket for the purpose described.

2. In an automatic pipe-coupler the combination of a nose having a recess at one side thereof, a guide-plate, a pocket formed intermediate the nose and guide-plate with outwardly-flaring lips, a spring secured to the guide-plate having a hooked inner end entering an opening at one side of the pocket for the purpose described.

3. In an automatic pipe-coupler, the combination of a nose having a flat inner face and a curved recess in its outer face near its outer end, an outwardly-extending guide-plate forming a pocket between it and the nose, and a spring secured to the guide-plate for the purpose described.

4. In an automatic pipe-coupler, the combination of a nose, an outwardly-extending guide-plate forming an intermediate pocket between it and the nose, said guide-plate being extended beyond the pocket and increasing in width as its outer end is approached, and flanges on the inner face of the guide-plate for the purpose described.

5. In an automatic pipe-coupler, a coupler-head comprising a nose having openings passing therethrough, an outwardly-extending guide-plate forming with the nose an intermediate pocket, gaskets in said openings, and a spring carried by the guide-plate for forcing a corresponding nose into contact with the gaskets.

6. In an automatic pipe-coupler the combination of a spring of substantially hook shape having one end in fixed relation to the draw-head and its opposite end in connection with a pipe-coupler head, adapting the latter to a slight lateral movement.

7. In an automatic pipe-coupler a hooked spring in fixed relation at one end to the draw-head of a car or the like, a pipe-coupler head attached to the opposite end of the spring, said head comprising an outwardly-extending guide-plate and a nose forming an intermediate pocket as described.

8. In an automatic pipe-coupler, a coupler head comprising a nose and an outwardly-extending guide-plate forming with said nose an intermediate pocket having outwardly-flaring lips at its edges, said guide-plate extending beyond the pocket and having flanges on the inner face thereof, for the purpose described.

9. In an automatic pipe-coupler, a coupler-head comprising a nose having a curved recess at its outer face, an outwardly-extending guide-plate forming a pocket between it and the nose, flanges on the inner face of the guide-plate, outwardly-flaring lips at the edges of the pocket and a spring secured to the guide-plate, having a hooked end passing into the pocket for the purpose described.

10. In an automatic pipe-coupler, a coupler-head comprising a nose having a curved recess on its outer face, an outwardly-extending guide-plate increasing in width from its outer end and forming a pocket between it and the nose, flanges on the inner face of the guide-plate, outwardly-flaring lips at the edges of the pocket, reinforcing-ribs at the outer face of the guide-plate, a rearwardly-extending spring attached to the guide-plate, said spring having a hooked end passing into one side of the pocket for the purpose described.

11. In an automatic pipe-coupler, a coupler-head, means to admit of a limited free lateral movement of the head, means admitting of the forward and rearward yielding of the head, means coupling the air and steam pipes of a car or the like with the head, and means for cutting off the communication between the air and steam pipes and head and communicating said pipe with side pipes for the purpose described.

12. In an automatic pipe-coupler, a hooked spring fixed at one end of the draw-bar or a car or the like, a coupler-head suspended from the opposite end of the spring, said head comprising a nose with an outwardly-extending guide-plate forming a pocket between it and the nose and a spring secured to the guide-plate and extending into an opening in the pocket for the purpose described.

In witness whereof I have signed my name to this specification in the presence of two subscribing witnesses.

WILLIAM F. THORNTON, JR.

Witnesses:
W. W. HOLT,
JNO. M. RITTER.